Patented Nov. 24, 1925.

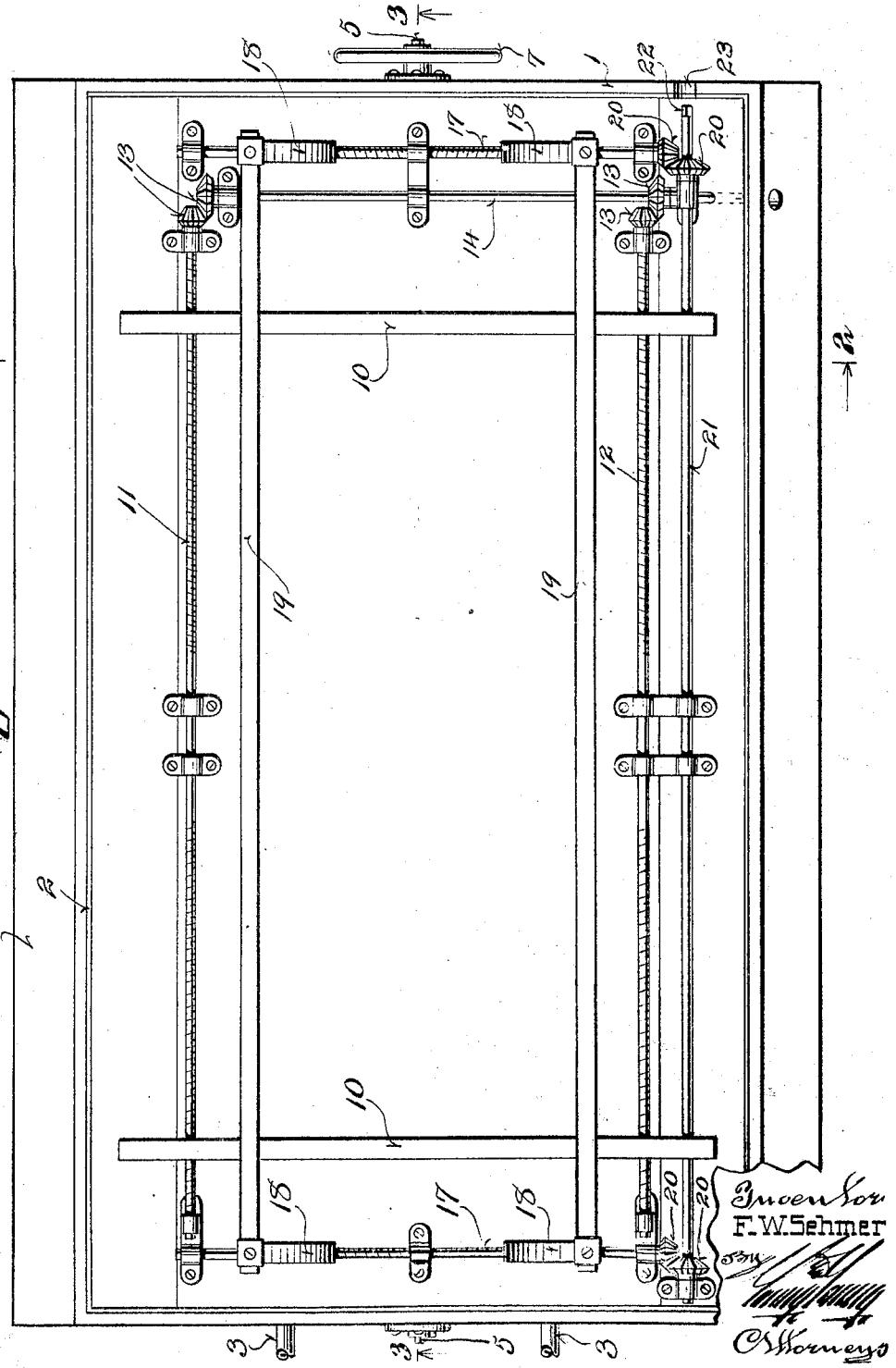

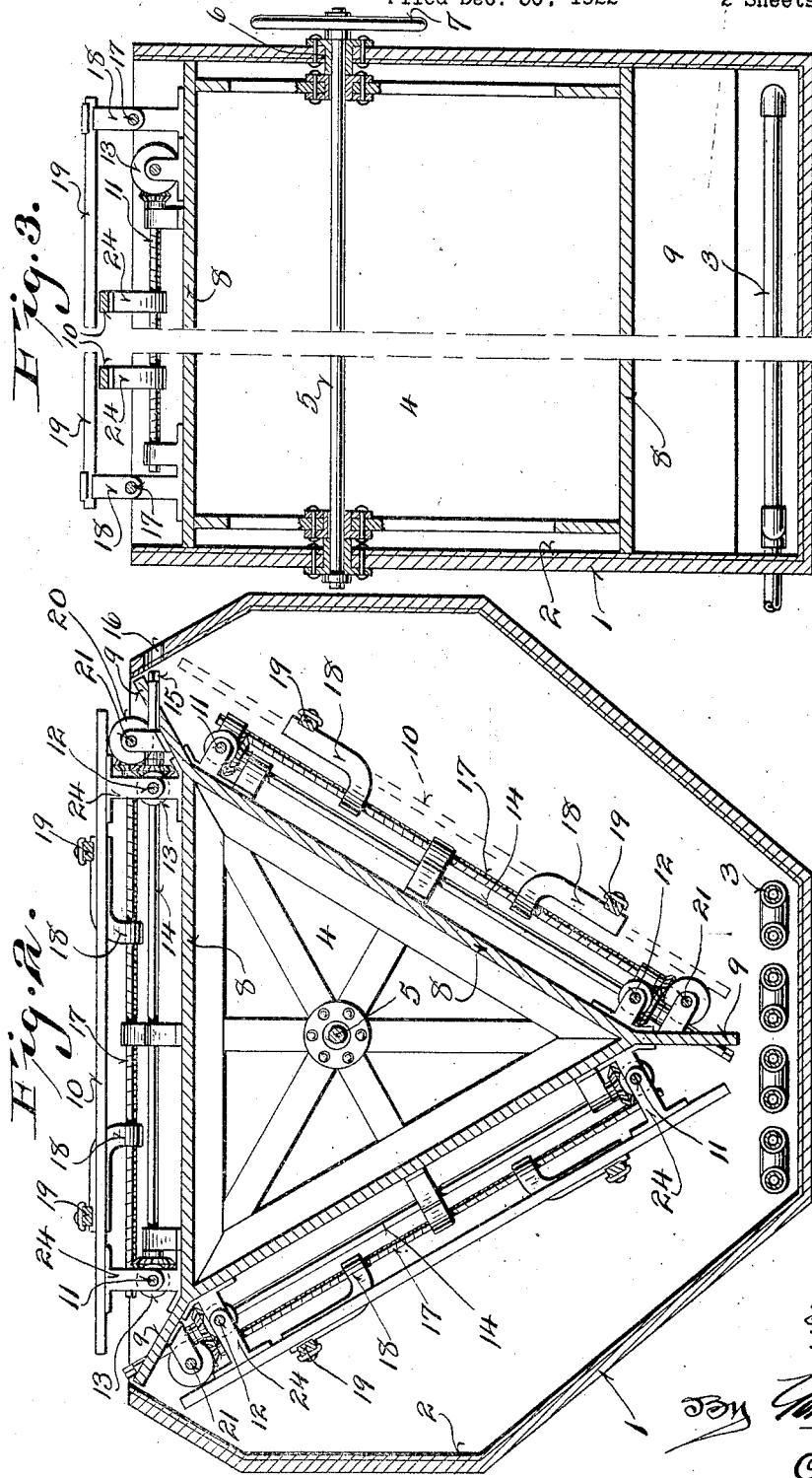

1,562,595

UNITED STATES PATENT OFFICE.

FREDERICK W. SEHMER, OF WAUWATOSA, WISCONSIN, ASSIGNOR TO PEERLESS DYE WORKS, OF MILWAUKEE, WISCONSIN.

CURTAIN STRETCHER.

Application filed December 30, 1922. Serial No. 609,922.

*To all whom it may concern:*

Be it known that I, FREDERICK W. SEHMER, a citizen of the United States, and resident of Wauwatosa, in the county of Milwaukee and State of Wisconsin, have invented certain new and useful Improvements in Curtain Stretchers; and I do hereby declare that the following is a full, clear, and exact description thereof.

This invention relates to curtain stretchers and driers.

Objects of this invention are to provide a machine which will handle a large number of curtains in a short period of time, which will economize space, which may be readily manipulated by a single operator, which can be accurately and easily adjusted to accommodate any size of curtain, and which is continuous in its operation.

Further objects are to provide a machine which is of strong and substantial construction, which is efficient in its operation, and which may be cheaply produced.

An embodiment of the invention is shown in the accompanying drawing, in which:—

Figure 1 is a plan view of the apparatus.

Figure 2 is a sectional view on the line 2—2 of Figure 1.

Figure 3 is a sectional view on the line 3—3 of Figure 1.

Referring more particularly to the drawings, it will be seen that the device comprises a casing 1 which may be lined, as indicated at 2, with asbestos or other suitable material. This casing may be of any desired shape, and is provided with an open upper portion. Within the lower portion of the casing, a plurality of heating coils 3, such as steam pipes, are positioned and are adapted to maintain the interior of the casing at a relatively high temperature to facilitate drying of the curtains.

Within this casing, a drum, indicated generally at 4, is revolubly mounted, such drum being rigidly secured to a longitudinal shaft 5 which, in turn, is revolubly mounted in the bearings 6 in the end portions of the casing 1. The outer end of the shaft may conveniently be provided with a manipulating hand wheel 7, and if desired, with a plurality of centering notches or any suitable centering means, not shown, to aid in properly positioning the drum in any one of its several positions of adjustment.

The drum is provided with a plurality of faces 8, which, in the form shown, are three in number, arranged in a triangular manner and provided with outwardly projecting portions 9 which, when one of the faces is horizontal, as indicated in Figure 2, cooperate with the side walls of the casing 1 to substantially close the open end thereof. Each of these faces carries duplicate mechanism for stretching and positioning the curtain. One only of such sets of mechanism will therefore be described in detail.

A pair of transverse bars 10 are threaded upon longitudinal screws 11 and 12, such screws having reversely threaded end portions, as may be seen from Figure 1. These longitudinal screws are carried in suitable bearings at their ends and at an intermediate portion, and are connected by means of bevelled gears 13 with a transverse operating shaft 14, such shaft terminating in a crank receiving squared end 15, as may be seen from Figure 2, and aligning with an aperture 16 in the side of the casing 1. It will be seen, therefore, that as the shaft 14 is rotated, the screws 11 and 12 are simultaneously rotated and the bars 10 are maintained in parallelism and are moved to their adjusted position.

A shorter pair of screws 17 are arranged transversely and are threaded thru brackets 18 secured to longitudinal bars 19. These screws have reversely threaded ends, and are connected by means of bevelled gears 20 to a longitudinal shaft 21 terminating in a crank-receiving end 22 adapted to align with an aperture 23 in one of the end walls of the casing 1, as may be seen from Figure 1.

It is to be noted that the brackets 18 have inwardly and downwardly turned terminal portions so as to provide maximum adjustment of the bars 19. The bars 10 may be similarly equipped, if desired, but it is found that the simple form of bracket, as indicated at 24 (see Figure 2) is sufficient.

These bars 10 and 19 may be provided with fastening devices, if desired, to engage the curtains, or they may be covered with screen cloth or carding wire, or any suitable material to which the curtains may be secured.

It will be seen that a curtain stretcher and drier has been provided in which the curtain may be secured at their margins to the bars and may be stretched to the desired shape with the greatest facility. It will further be seen that stretching in both directions may be accomplished by manipulating the apparatus from one corner only of the device, as shown in Figure 1.

It is particularly to be noted that the device is substantially continuous in its operation, that is to say, while the operator is securing a curtain upon the uppermost of the bars when the device is in the position shown in Figure 2, for instance, the curtains upon the other two faces of the apparatus are in the drying chamber or within the housing 1, and are being dried in a rapid manner. It is, therefore, apparent that during the interval required to attach a curtain, the next curtain is substantially dried and the apparatus may be rotated so as to present the dry curtain uppermost and move the new curtain into the drying chamber. In this manner a very rapidly operating apparatus is secured, and the operation is substantially continuous.

I claim:

1. A curtain stretcher and drier comprising a housing having an open top and adapted to form a heating compartment, a drum revolubly mounted within said housing and provided with a plurality of flat faces, the exposed face of which is normally positioned below the opening of said housing, radial portions extending from the corners of said drum and cooperating with the faces of the drum and sides of said housing to form a closure for the latter, curtain receiving bars carried by each of said drum faces, and means for actuating said bars.

2. A curtain stretcher and drier comprising a housing having an open top and adapted to form a heating compartment, a drum revolubly mounted within said housing and provided with a plurality of flat faces, the exposed face of which is normally positioned below the opening of said housing, radial portions extending from the corners of said drum and cooperating with the faces of the drum and sides of said housing to form a closure for the latter, curtain receiving bars carried by each of said drum faces, and means for actuating said bars, said actuating means being positioned below said bars and the upper edge of said housing when exposed to bring said bars into close proximity to the upper edge of the housing, said housing being provided with apertures in its sides to permit access to said bar actuating means.

In testimony that I claim the foregoing I have hereunto set my hand at Wauwatosa, in the county of Milwaukee and State of Wisconsin.

FREDERICK W. SEHMER.